United States Patent
De Moura et al.

(10) Patent No.: US 8,500,410 B2
(45) Date of Patent: Aug. 6, 2013

(54) BLADE MADE OF COMPOSITE MATERIAL COMPRISING A DAMPING DEVICE

(75) Inventors: Raul Fernando De Moura, Paris (FR); Pierrick Bernard Jean, Paris (FR); Son Le Hong, Thomery (FR); Jean-Pierre Francois Lombard, Pamfou (FR)

(73) Assignee: SNECMA, Paris (FR)

( * ) Notice: Subject to any disclaimer, the term of this patent is extended or adjusted under 35 U.S.C. 154(b) by 700 days.

(21) Appl. No.: 12/720,226

(22) Filed: Mar. 9, 2010

(65) Prior Publication Data

US 2010/0232974 A1 Sep. 16, 2010

(30) Foreign Application Priority Data

Mar. 12, 2009 (FR) ...................... 09 51559

(51) Int. Cl.
*F01D 5/16* (2006.01)
(52) U.S. Cl.
USPC ............... 416/229 R; 416/229 A; 416/241 R; 416/500
(58) Field of Classification Search
USPC .............. 416/229 A, 229 R, 230, 232, 241 A, 416/241 R, 500
See application file for complete search history.

(56) References Cited

U.S. PATENT DOCUMENTS

| | | | | |
|---|---|---|---|---|
| 3,357,850 A | * | 12/1967 | Baker | 416/229 A |
| 4,097,193 A | * | 6/1978 | Brunsch et al. | 416/224 |
| 4,895,491 A | * | 1/1990 | Cross et al. | 416/224 |
| 5,335,463 A | * | 8/1994 | Reinhall | 52/167.1 |
| 5,913,661 A | * | 6/1999 | Panovsky et al. | 416/229 A |
| 6,039,542 A | * | 3/2000 | Schilling et al. | 416/233 |
| 6,471,484 B1 | * | 10/2002 | Crall | 416/229 R |
| 7,311,500 B2 | * | 12/2007 | Rongong et al. | 416/230 |
| 7,789,630 B2 | * | 9/2010 | Schilling et al. | 416/224 |
| 7,955,054 B2 | * | 6/2011 | El-Aini et al. | 416/146 R |
| 8,061,997 B2 | * | 11/2011 | Le Hong et al. | 416/230 |
| 8,251,664 B2 | * | 8/2012 | Schreiber | 416/191 |
| 2005/0056965 A1 | * | 3/2005 | Hawkins et al. | 264/258 |
| 2008/0075601 A1 | * | 3/2008 | Giusti et al. | 416/229 A |
| 2008/0152506 A1 | * | 6/2008 | Schreiber | 416/229 R |
| 2008/0236739 A1 | * | 10/2008 | Ashley | 156/285 |
| 2009/0074586 A1 | * | 3/2009 | Le Hong et al. | 416/230 |
| 2010/0232974 A1 | * | 9/2010 | De Moura et al. | 416/230 |

FOREIGN PATENT DOCUMENTS

| | | |
|---|---|---|
| EP | 0 926 312 A2 | 6/1999 |
| EP | 1 253 290 A2 | 10/2002 |
| EP | 1 930 159 A1 | 6/2008 |
| EP | 2 037 082 A1 | 3/2009 |

(Continued)

*Primary Examiner* — Edward Look
*Assistant Examiner* — Christopher R Legendre
(74) *Attorney, Agent, or Firm* — Oblon, Spivak, McClelland, Maier & Neustadt, L.L.P.

(57) ABSTRACT

A blade made of composite material including an airfoil formed of filaments or fibers, optionally woven, impregnated with a heat-curable resin, with an intrados wall and an extrados wall between the leading edge and the trailing edge; and a device for damping the vibrations incorporated in one or other of the intrados and extrados walls is disclosed. The damping device is formed of at least one layer made of viscoelastic material and a layer made of rigid material, these layers being superposed. The layer made of rigid material includes a first zone and a second zone. The layer made of viscoelastic material is interposed between the airfoil and the first zone of the rigid layer, and the second zone of the rigid layer is attached to the wall of the airfoil without interposition of viscoelastic material.

19 Claims, 3 Drawing Sheets

FOREIGN PATENT DOCUMENTS

| | | |
|---|---|---|
| FR | 2 336 299 | 7/1977 |
| GB | 452841 | 8/1936 |
| GB | 2 391 270 A | 2/2004 |
| GB | 2 401 407 A | 11/2004 |
| GB | 2 439 551 A | 1/2008 |

\* cited by examiner

BLADE MADE OF COMPOSITE MATERIAL COMPRISING A DAMPING DEVICE

The present invention relates to the field of turbomachines. It relates to the damping of a blade made of a composite material and its object is more particularly the damping of a fan blade in a turbojet engine or else a propeller airfoil in a turboprop engine.

BACKGROUND OF THE INVENTION

The blades, notably of a fan, but also of a low-pressure compressor, made of composite material with carbon fibers are made in different ways. According to one manufacturing method, a stack of one-way plies or preimpregnated wovens is produced that is placed in a mold while orienting the successive plies differently before compacting and polymerization in an autoclave. According to another method, woven preforms of dry fibers are prepared that are assembled by sewing or else a single preform made of woven fibers in three dimensions, that is impregnated with resin by injection in a closed mold. The blade is formed in a single piece comprising the root with the airfoil. It comprises various protections in order to reinforce the thermomechanical resistance thereof. A metallic protection is therefore attached to the leading edge or to the whole contour of the airfoil comprising the leading edge, the blade tip and the trailing edge, for example in the form of a titanium part bonded over the whole surface of the leading edge and over a front portion of the outer surfaces of the extrados wall by mounting a protective film that can be made of a synthetic material, polyurethane for example, and directly bonded to the intermediate part.

The object of the invention is this type of blade with at least one protection along the leading edge. An example of manufacture is described in patent EP1777063 in the name of the present applicant.

The object of the invention is more generally any type of blade made of composite material, the airfoil of which is formed of fibers, threads or filaments, optionally woven, impregnated with a heat-curable resin.

Flutter is a phenomenon of coupling between the aerodynamic and elastic characteristics of the blade creating unstable situations. A flutter manifests itself asynchronously. Subsonic flutter is distinct from supersonic flutter. The fan blade is mainly concerned by subsonic flutter.

Flutter is a phenomenon that is difficult to predict, because of the complexity of the coupling between the aerodynamic and mechanical responses. Moreover, the mechanical damping of the blade is usually not very well known. Finally, in the current design of increasingly loaded blading, flutter is a phenomenon that must be particularly taken into account.

During the design of the fan blade, a margin of flutter is estimated, which measures, at a given flow rate, the difference between the line of flutter and the line of operation. This value is usually established based on a known reference (the closest) by adding thereto the differences calculated between this reference configuration and the new configuration. The criteria used nowadays for subsonic flutter on 1F and 1T modes and on zero diameter coupled mode are:

Twist Bend Coupling (TBC), representing the ratio between the movements in twisting mode and in bending mode. The higher the TBC parameter, the greater the risk of flutter also.

The reduced speed or Strouhal criterion given by the following formula:

$VR = W/C*f*pi$, where W is the relative speed, C the chord of the blade at a given height and f the frequency of the blade mode in question. This criterion represents the coherence between the vibrational frequency of the blading and the frequency of the unsteadiness of the flow along this blading.

Other factors may influence the flutter margin and may occasionally be used when the phenomenon is encountered during tests: reduction of the specific flow rate, reduction of the number of blades or increase in the chord, lubrication of the blade root, detuning.

The object of the invention is to improve the harmonic response of the blade to synchronous aerodynamic excitations such as:

inlet duct distortions generated by flying conditions in angle of incidence—climbs, descents, crosswinds, the harmonic excitations generated by a residual imbalance, backpressure fluctuations, induced by a fixed impeller of the stator type on a fan impeller, wake or backpressure fluctuations induced by a moving fan impeller on its neighbor in the case of an architecture with two contrarotating rotors.

DESCRIPTION OF THE PRIOR ART

A damping technology has been studied for several years by the present applicant with a first evaluation on one-piece bladed disks. The latter terms designate a disk-and-blade assembly manufactured in a single piece. The operating principle of the damping system is based on the dissipation of energy through the shearing of a suitably placed viscoelastic material. The correct behavior of the damping system is dependent on the dimensions of the material and on good adhesion between the material and the engine part.

Also known is U.S. Pat. No. 6,471,484 which describes a system for damping vibrations in a gas turbine engine rotor comprising a single-piece bladed disk. The airfoils of the blades are provided with a cavity hollowed in an intrados face or extrados face and containing a layer of damping material with a stress layer. A covering sheet covers the cavity. In operation, the damping of the vibrations is promoted by the shearing stresses induced in the damping material between the airfoil and the stress layer on the one hand and in the damping material situated between the stress layer and the covering sheet on the other hand. Patent application EP926312 describes a similar damping device applied to a fan blade of a turbojet engine.

SUMMARY OF THE INVENTION

The object of the present invention is an improvement to this technique in an application to a blade made of composite material with, in particular, optimization of the location of the damping treatment.

According to the invention, the turbomachine blade made of composite material, such as a fan blade of a turbojet engine or a propeller airfoil of a turboprop engine, comprising an airfoil formed of filaments or fibers, optionally woven, impregnated with a heat-curable resin, with an intrados wall and an extrados wall between the leading edge and the trailing edge, is characterized in that a device for damping the vibrations is incorporated in at least one of the intrados and extrados walls, and is formed of at least one layer made of viscoelastic material and a layer made of rigid material, these layers being superposed, the layer made of rigid material comprises a first zone and a second zone, the layer made of viscoelastic material being interposed between the airfoil and said first zone of the rigid layer, and said second zone of the rigid layer being attached to the wall of the airfoil without interposition of viscoelastic material and the rigid layer comprises said first zone and said second zone, and is arranged so that the first zone of the rigid layer comprises at least two lobes, the two lobes being attached to the second zone.

According to one embodiment, the layer made of viscoelastic material is attached, by the vulcanization of a film of viscoelastic material, by bonding by means of an adhesive material or by a mechanical connection such as by bolting or screwing, to the rigid layer on one side and to the airfoil on the other side.

The thickness of the viscoelastic layer is advantageously situated between 0.1 mm and 1 mm. The layer of rigid material, for its part, preferably has a thickness of between 0.5 mm and 1 mm.

For this other embodiment, the second zone, by which the rigid layer is secured to the airfoil, is preferably situated radially on the side of the root of the blade relative to the first zone. More particularly, the second zone of the rigid layer is bonded to the airfoil. Optionally the rigid layer may be held and immobilized along this second zone by mechanical means.

The functions of the viscoelastic layer are to introduce a mechanical damping for the vibratory responses of the blade, in particular in the case of a fan blade for the bending mode 1F and twisting mode 1T, and also to play a damping role during phenomena such as during a bird strike, by absorbing a fraction of the impact energy and thus limiting the damage to the blade. The damping device is applied in the zones that are subjected to high deformation energy levels of the vibratory mode to be damped. The zones in which the levels are at a maximum are particularly sought.

According to another objective of the invention, there has been an attempt to optimize the shape of the device in order to obtain the best possible damping. It has therefore been determined that the shearing stresses were at a maximum in the peripheral zone of the rigid layer. The invention therefore proposes to form the rigid layer so that its contour is as long as possible taking account of the surface covered by the device.

The rigid layer comprises at least two lobes. The shape of the lobes may be varied. The lobes may advantageously have an elongated shape and extend in a radial direction relative to the root of the blade. Therefore the shape may be comb-like, star-like or another shape. According to another particular embodiment, an overall contour of increased length is created by arranging cuts along closed, for example circular, lines in the rigid layer.

According to another embodiment, the layer of viscoelastic material is contained at least partially in a cavity arranged in the composite material of the airfoil.

The viscoelastic material is chosen from materials such as rubber, silicone, polymer elastomer or epoxy resin. It may have a single layer or many layers and the layers may if necessary be formed of different materials, depending on the environment, the materials used and the damping characteristics sought. For example, the damping characteristics may differ to cover more extensive temperature ranges.

The rigid layer is metallic or else made of the same material, based on filaments, as the airfoil. "Filaments" also means threads and fibers. To the extent that the rigid layer has sufficient rigidity in the direction of the deformations of the airfoil, the layer may be thin and not disrupt its aerodynamism.

According to another embodiment, at least one additional layer made of rigid material is interposed at least partly between the rigid layer and the airfoil, with two layers of viscoelastic material placed on either side of the additional layer, the viscoelastic layers being formed of different or identical materials.

Preferably the layer of viscoelastic material is secured to the rigid layer and/or to the airfoil by vulcanization of a film of viscoelastic material or else by bonding by means of an adhesive material. The layers may also be secured to one another by a mechanical connection means, such as bolting or screwing.

According to a particular application, the leading edge of the airfoil comprises a protective coating formed of a metal strip bonded to the airfoil on at least a portion of its surface.

In the latter case, advantageously a layer of viscoelastic material is interposed at least partly between the metal strip and the airfoil so as to form a second vibration-damping device.

According to a variant, said metal strip is rigidly connected to the rigid layer of the damping device applied to the intrados or extrados wall.

Finally, the invention relates to a method for producing a damping device on a blade according to which the shape of the lobes of the first zone of the rigid layer is determined so as to have a contour of the rigid layer that is as high as possible taking account of its surface area.

BRIEF DESCRIPTION OF THE DRAWINGS

A nonlimiting embodiment of the invention will now be described in greater detail with reference to the appended drawings in which.

DESCRIPTION OF THE PREFERRED EMBODIMENTS

Figure 1:
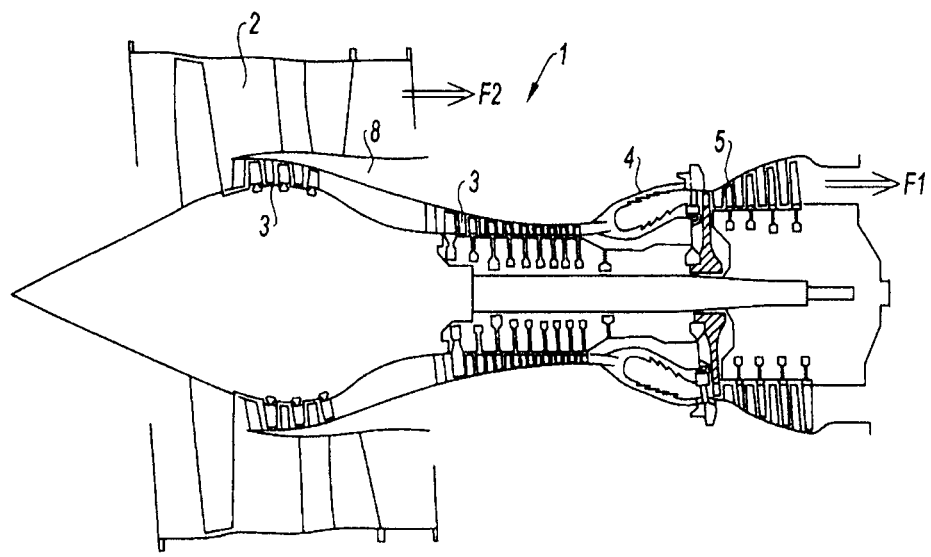
FIG. 1 represents schematically a turbojet engine with a front fan.

With reference to FIG. 1, shown schematically is an example of a turbo-machine in the form of a twin-spool bypass turbojet engine 1. A fan 2 at the front supplies the engine with air. The air compressed by the fan is divided into two concentric flows F1 and F2. The secondary flow F2 is discharged directly into the atmosphere and provides an essential portion of the motive thrust. The primary flow F1 is guided through several compression stages 3 to the combustion chamber 4 where it is mixed with the fuel and burned. The hot gases supply the various turbine stages 5 which drive the fan 2 and the compression rotors 3. The gases are then discharged into the atmosphere.

Figure 2:
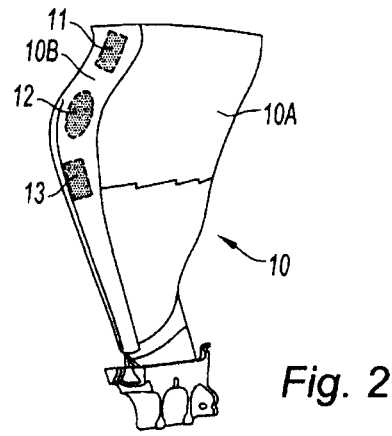
FIG. 2 shows a fan blade made of composite material with a protective element protecting the leading edge having zones comprising a viscoelastic damper.
Figure 3:
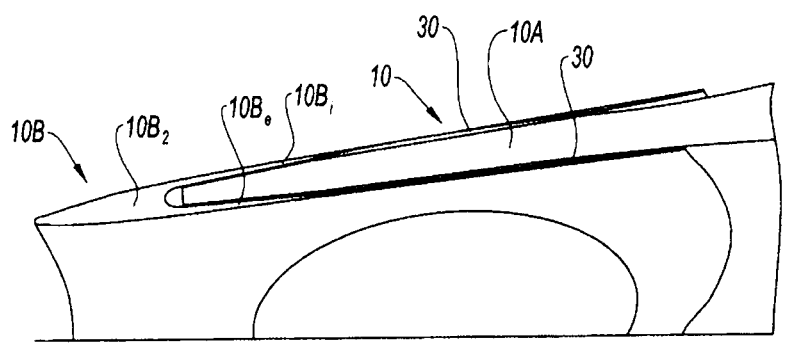
FIG. 3 shows, in a top view of the blade of FIG. 2, the region of the leading edge of the blade.

FIGS. 2 and 3 show a fan blade 10 capable of being used on this type of engine. It is a blade made of composite material. In general, the airfoil 10A, made of composite material, of the blade consists of fibers or filaments linked together by a heat-curable resin. The filaments or fibers are made of carbon or another material such as glass, silica, silicon carbide, alumina, aramid or an aromatic polyamide. The filaments are, according to a known method of assembly, in the form of woven elements. The leading edge is in this instance coated with a metallic protective means 10B. It is, for example, a titanium foil bonded by the layer 30 to the composite material extending along the leading edge, with a strip forming a wing on each side: one wing 10Bi on the intrados wall downstream of the leading edge and one wing 10Be on the extrados wall downstream of the leading edge. The two wings are connected along the leading edge by a thicker portion $10B_2$.

Such a blade is manufactured for example according to the technique described in patent EP 1,777,063 in the name of the present applicant.

According to the latter technique, a preform is constructed by weaving filaments in three dimensions. The one-piece woven preform is then trimmed to shape by cutting the contour according to a three-dimensional graphic. The part is placed in a forming mold. Then, after appropriate deformation, the part is placed in a compacting mold which stiffens the deformed preform. The leading edge is overcompacted so as to allow the placement of the protective element along the leading edge. This is an element in the form of a longitudinal half-sleeve with two wings designed to cover a portion of the extrados wall and intrados wall downstream of the leading edge. As explained in the patent cited above, the protective element is placed in a mounting device capable of parting the wings. The protective element is placed, via its leading edge pre-coated with adhesive, between the two wings and then the latter are released.

The assembly is placed in an injection mold into which a binder comprising a heat-curable resin is injected so as to impregnate the whole preform. Finally the mold is heated to the curing temperature of the resin. It is then sufficient to remove the part from the mold.

In patent application FR 0706430 dated Sep. 13, 2007 in the name of the present applicant, a description is given of the production of a vibration-damping means by incorporating, between one of the intrados or extrados walls of the airfoil and the protective element 10B, at least one layer of a viscoelastic material, located for example in one of the zones 11, 12 or 13. The metal protective element 10B forms a rigid backing layer for the vibration-damping system that it forms with the layer of viscoelastic material.

Figure 4:
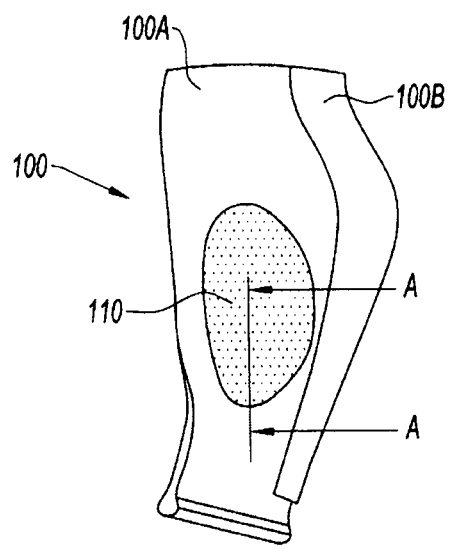
FIG. 4 shows a schematic view in perspective of a blade comprising a vibration-damping device according to the invention.

According to the invention, a damping device is placed on the intrados wall and/or the extrados wall. In FIG. 4, which represents schematically a blade provided with a damping device, the damping is achieved on the extrados wall of the airfoil 100A. In this instance, this airfoil comprises a protective element 100B fitted to the leading edge. The airfoil is obtained as in the airfoil of application FR 0706430 reported above based on filaments or fibers impregnated with a heat-curable resin.

The damping device comprises a viscoelastic layer 111 interposed between the wall 100A, intrados or extrados, of the airfoil and a rigid layer 110.

Viscoelasticity is a property of a solid or a liquid which, when it is deformed, exhibits a behavior that is both viscous and elastic by simultaneous dissipation and storage of mechanical energy.

A rigid material in the vibration-damping system is more rigid than the viscoelastic material of the layer. In other words, the isotropic or anisotropic characteristics of elasticity of the material of the backing layer are greater than the isotropic or anisotropic characteristics of the viscoelastic material in the desired thermal and frequency operating range. The material of the viscoelastic layer is of the rubber, silicone, polymer elastomer, epoxy resin or thermoplastic material type.

The embodiment shown in FIG. 4 illustrates a device covering approximately ⅓ of the intrados surface area and/or extrados surface area of the blade. This ratio of one third of the intrados or extrados surface area to which the device is applied preferably corresponds more generally to the extent of the device of the invention.

Figure 6:
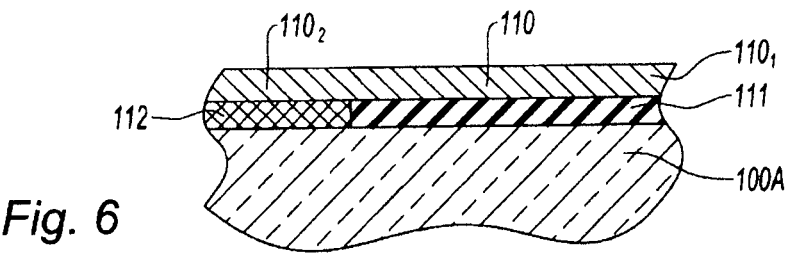
FIG. 6 shows an arrangement of the damping device of the invention.

The arrangement of the damping device can be seen in FIG. 6 which shows a partial section of the blade in the direction A-A in FIG. 4. The rigid layer 110 is attached by means of a rigid attachment means 112 directly to the wall 100A of the airfoil. The attachment means is advantageously a layer of adhesive material. However, a mechanical means is equally suitable.

In this embodiment, the rigid layer comprises two zones: a first zone $110_1$ and a second zone $110_2$. The attachment means 112 extends along the second zone $110_2$. A viscoelastic material 111 is interposed between the wall 100A of the airfoil and the first zone $110_1$ to which this material is attached.

Preferably the second zone $110_2$ by which the rigid layer is attached to the blade is on the side of the blade root relative to the first zone. Depending on the bending or twisting deformation, the rigid layer moves relative to the blade wall and the viscoelastic layer opposes by resisting the movement. The result of this is an action of damping against the vibrations sustained by the blade. The device is preferably placed on the portions of the blade sustaining maximum deformation for the mode in question.

The solution of the invention makes it possible to produce a thin device. The rigid layer, the thickness of which is between 0.5 and 1 mm, is formed so as not to affect the air flow along the airfoil and the aerodynamic properties of the latter. If necessary, the airfoil is slightly hollowed in order to contain the damping device so that its outer profile is in the continuity of the blade wall.

The invention is not limited to this embodiment, the layer made of rigid material is, according to one embodiment, attached to the airfoil by means of the viscoelastic layer which adheres or is bonded both to the layer of rigid material and to the airfoil.

Figure 7:
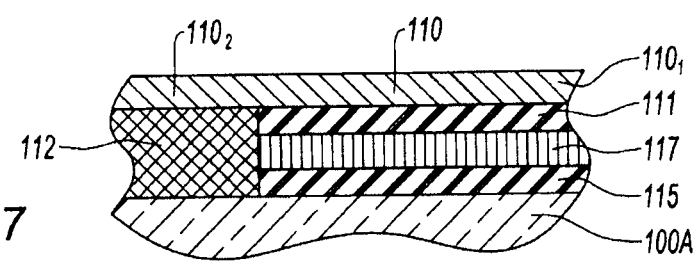
FIG. 7 shows another arrangement of the damping device of the invention.

According to a variant illustrated by FIG. 7, the damping device comprises an additional rigid layer 117 between the rigid covering layer 110 and the wall 100A. The additional rigid layer 117 is held between two layers of viscoelastic material: one layer 111 between the two rigid layers 117 and 110, one layer 115 between the wall 110A and the additional rigid layer 117. The rigid layers may be formed of the same material or of different materials. The same applies to the two viscoelastic layers 111 and 115 which may be made of different materials depending on the environment and the damping sought.

Figure 8:
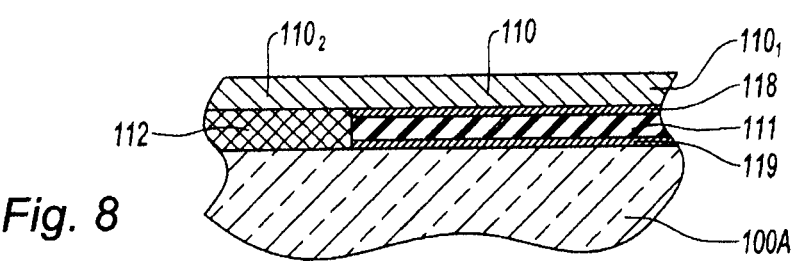
FIG. 8 shows another arrangement of the damping device of the invention.

The additional layer 117 is not attached to the wall; it is preferably free to move to the extent that the deformation of the viscoelastic material allows. The viscoelastic layer is secured to the layers and walls that are in contact with it by vulcanization, to the extent of the possibilities offered by the material. It can also be bonded as can be seen in FIG. 8. The layer 111 is bonded by means of a film of an appropriate adhesive substance, 118 and 119 respectively, to the rigid layer 110 and to the wall 100A.

The embodiments of FIGS. 7 and 8 show the attachment 112 of the rigid layer to the wall.

However, the invention also includes the embodiment in which the connection of the rigid layer to the airfoil is obtained only by means of the viscoelastic and rigid intermediate layers.

Figure 5:
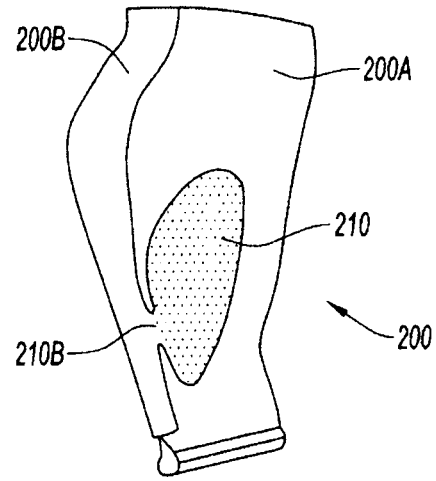
FIG. 5 shows a schematic view in perspective of a blade comprising a vibration-damping device according to a variant embodiment of the invention.

FIG. 5 shows a variant damping device on a blade 200 combining the damping achieved by the rigid layer 210 on the wall, in this instance the intrados, of the airfoil and the damping achieved by the protective layer 200B of the leading edge of the airfoil associated with a viscoelastic layer. According to this combination, the two layers 200B and 210 are secured in a coupling zone 210B at the tangency between the two plates forming the layers.

The coupling zone 210B between the rigid layer 210 and the leading edge may have a greater or lesser extent. Nevertheless, preferably, the aim is to minimize it in order to prevent a phenomenon of mechanical locking of shearing on the damper of the airfoil wall. Specifically, the larger the coupling zone, the less the vibration energy is dissipated.

It should be noted that the coupling zone 210b, although formed of rigid material, allows relative movement between the rigid layer 210 and the protective layer 200B.

In this case, the two layers 210 and 200B are cut from one and the same material.

In the embodiment with two zones of the rigid layer, the viscoelastic layer is placed in a first zone between the two rigid layers and the airfoil. A second zone of this assembly can be rigidly attached to the airfoil.

Figure 9:
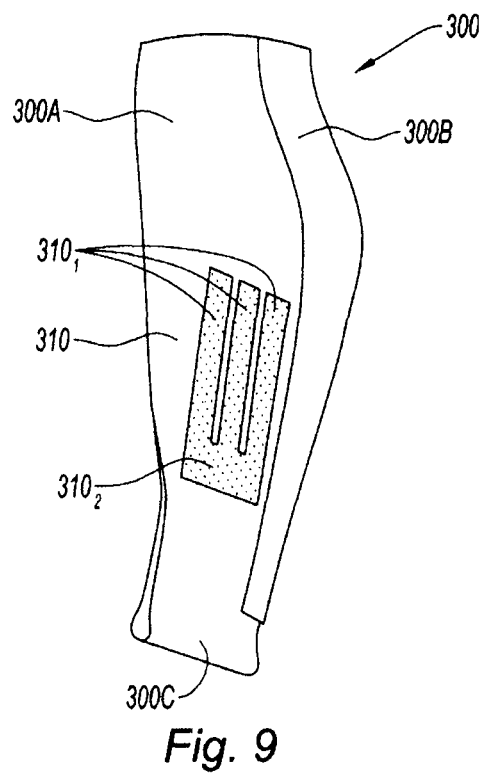
FIG. 9 shows a schematic view in perspective of a blade comprising a variant of a vibration-damping device according to the invention.

FIG. 9 shows a variant of the invention. On the basis of an observation that the damping is more effective at the border of the rigid layer, the rigid layer is formed so as to maximize the extent of this border. According to the nonlimiting example illustrated by FIG. 9, the first zone beneath which the viscoelastic layer is interposed is in the form of lobes or in this instance of fingers $310_1$; these lobes preferably extend radially relative to the root 300C of the blade, substantially parallel to the plate 300B protecting the leading edge. The lobes are connected to the second zone $310_2$ of the rigid layer 310 which is rigidly attached to the wall 300A of the blade. To the extent that the gradients of movement between the rigid layer and the application surface are at a maximum on the edges of the device, a structure with lobes allows an effective damping by shearing of the viscoelastic layer. Shearing is zero in the middle of the rigid layer because of the symmetry of the bending movement and is at the maximum on the edges where the gradient of movement between the rigid backing layer and the supporting structure is at the maximum.

Figure 10:
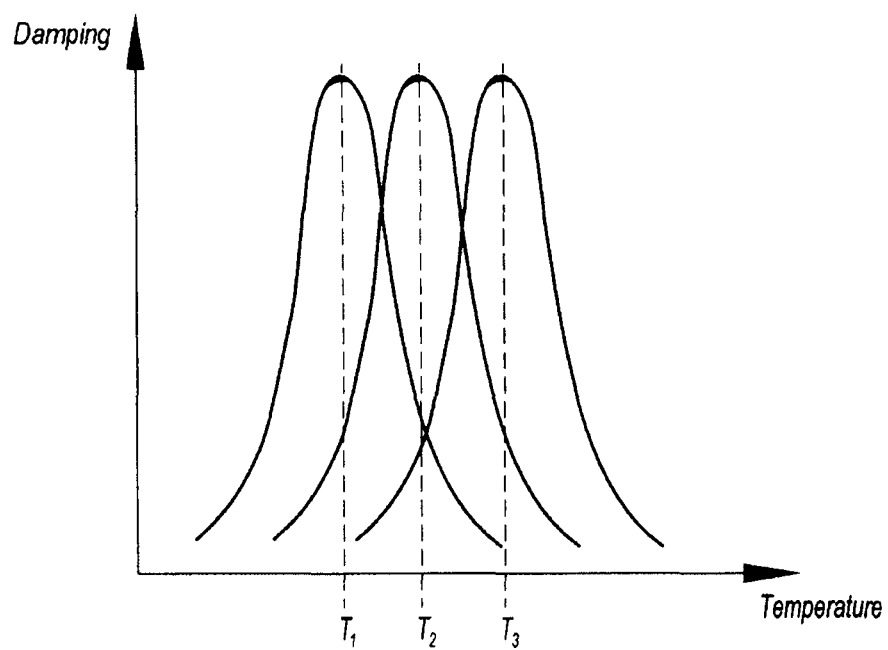
FIG. 10 is a graph showing the damping properties of a device comprising a combination of viscoelastic materials, over a range of temperatures.

In FIG. 10, the curves show the value there would be in combining several viscoelastic materials when it is a matter of being operational over a relatively extensive temperature range. Each material exhibits a peak for a given temperature. Here there are three materials, the effectiveness ranges of which cover distinct temperature ranges. By combining the three materials, the effectiveness of the damping device is extended over a temperature range covering the three temperatures T1, T2 and T3.

The materials are placed in layers side by side on the airfoil and/or superposed.

The invention claimed is:

1. A turbomachine blade made of composite material, comprising:
    an airfoil formed of filaments or fibers impregnated with a heat-curable resin, with an intrados wall and an extrados wall between a leading edge and a trailing edge; and
    a damping device for damping the vibrations incorporated in at least one of the intrados or extrados walls, the damping device being formed of at least one layer made of viscoelastic material and a layer made of rigid material, the rigid material being more rigid than the viscoelastic material, these layers being superposed,
    wherein the layer made of rigid material comprises a first zone and a second zone adjacent to the first zone, the first zone of the rigid layer comprising at least two lobes, the two lobes being attached to the second zone,
    wherein the layer made of viscoelastic material is interposed between the airfoil and said first zone of the rigid layer,
    wherein said second zone of the rigid layer is attached to the wall of the airfoil without interposition of viscoelastic material via a rigid attachment means, and
    wherein the rigid attachment means is disposed in the entirety of the second zone and a thickness of the rigid attachment means is substantially equal to a thickness of material in said first zone between the rigid layer and the wall of the airfoil.

2. The blade as claimed in claim 1, wherein the layer made of viscoelastic material is attached, by vulcanization of a film of viscoelastic material, by bonding by an adhesive material or by a mechanical connection to the rigid layer on one side and to the airfoil on the other side.

3. The blade as claimed in claim 2, wherein the second zone by which the rigid layer is attached to the airfoil is situated radially on the side of the root of the blade relative to the first zone.

4. The blade as claimed in one of claims 2 and 3, wherein the second zone of the rigid layer is bonded to the airfoil via the rigid attachment means.

5. The blade as claimed in claim 1, wherein the damping device is disposed in at least one zone of maximum deformations for at least one of the bending or twisting vibratory modes.

6. The blade as claimed in claim 1, wherein the lobes have an elongated shape.

7. The blade as claimed in claim 6, wherein the lobes extend in a radial direction relative to the root of the blade.

8. The blade as claimed in claim 1, wherein the layer of viscoelastic material is contained at least partially in a cavity arranged in the composite material of the airfoil.

9. The blade as claimed in claim 1, wherein the viscoelastic material is chosen from materials such as rubber, silicone, polymer elastomer, epoxy resin or thermoplastic material.

10. The blade as claimed in claim 9, wherein the damping device comprises at least two different viscoelastic materials, optionally placed in different layers, said layers side by side on the airfoil and/or superposed.

11. The blade as claimed in claim 10, wherein damping characteristics of the viscoelastic materials differ as a function of temperature.

12. The blade as claimed in claim 1, wherein the rigid layer is metallic or made of the same material as the airfoil.

13. The blade as claimed in claim 1, wherein at least one additional layer made of rigid material is interposed at least partly between the rigid layer and the airfoil, with two layers of viscoelastic materials placed on either side of said additional layer.

14. The blade as claimed in claim 13, wherein the viscoelastic layers are formed of different materials.

15. The blade as claimed in claim 1, wherein the leading edge of the airfoil comprises a protective coating formed of a metal strip bonded to the airfoil on a portion of its surface.

16. The blade as claimed in claim 15, wherein a layer of viscoelastic material is interposed at least partly between the metal strip and the airfoil so as to form a second vibration-damping means.

17. The blade as claimed in claim 16, wherein said metal strip is rigidly connected to the rigid layer of said vibration-damping device on one or other of the intrados or extrados walls.

18. The blade as claimed in claim 1, wherein the rigid attachment means is a layer of adhesive material or a mechanical device.

19. A method for producing a damping device on a blade as claimed in claim 1, wherein the shape of the lobes of the first zone of the rigid layer is determined to maximize a contour of the rigid layer.

* * * * *